United States Patent [19]
Betz

[11] Patent Number: 5,165,233
[45] Date of Patent: Nov. 24, 1992

[54] CHARGE PRESSURE PRIORITY VALVE

[75] Inventor: Michael A. Betz, Ames, Iowa

[73] Assignee: Sauer, Inc., Ames, Iowa

[21] Appl. No.: 676,562

[22] Filed: Mar. 28, 1991

[51] Int. Cl.$^5$ .................................. F15B 11/20
[52] U.S. Cl. ........................... 60/488; 137/101; 137/118
[58] Field of Search ............... 137/101, 118; 60/488

[56] References Cited

U.S. PATENT DOCUMENTS

| | | |
|---|---|---|
| 2,606,632 | 8/1952 | Schettler . |
| 2,818,711 | 1/1958 | Lincoln et al. . |
| 3,415,164 | 12/1968 | Gilewski et al. . |
| 3,618,628 | 11/1971 | Kramer . |
| 3,846,982 | 11/1974 | Rometsch ................ 60/488 X |
| 3,952,511 | 4/1976 | Turner et al. . |
| 3,979,908 | 9/1976 | Alderson ................ 137/101 X |
| 4,116,002 | 9/1978 | Knapp et al. . |
| 4,173,867 | 11/1979 | Schmidt et al. . |
| 4,192,337 | 3/1980 | Alderson et al. . |
| 4,756,330 | 7/1988 | Tischer . |
| 4,779,417 | 10/1988 | Kita ................ 60/488 X |
| 4,838,024 | 6/1989 | Yamamoto ................ 60/488 |
| 4,877,057 | 10/1989 | Christensen . |
| 5,069,037 | 12/1991 | Sakigawa ................ 60/426 X |

Primary Examiner—Alan Cohan
Attorney, Agent, or Firm—Zarley, McKee, Thomte, Voorhees & Sease

[57] ABSTRACT

A charge pressure priority valve for supplying a flow of sufficient pressure to energize an auxiliary implement while supplying a nearly constant pressure flow to a hydrostatic fluid circuit includes a valve body having an interior bore with a pump inlet passage for communicating a flow from a hydraulic pump thereto. A main flow outlet passage extends from the interior bore for supplying fluid to the hydraulic fluid circuit and has a main flow feedback passage interconnecting the main flow outlet passage and the interior bore. An auxiliary flow outlet passage extends from the interior bore for supplying a flow of sufficient pressure to energize an auxiliary implement. A valve spool is disposed within the interior bore and defines a central chamber intermediate a pair of spaced apart end chambers in the bore, with one of the pair of end chambers being isolated from the other of the pair of end chambers.

14 Claims, 2 Drawing Sheets

CHARGE PRESSURE PRIORITY VALVE

TECHNICAL FIELD

This invention relates to a valve for use in a hydrostatic transmission and, more specifically, to a valve for maintaining constant system pressure within a hydrostatic transmission fluid closed loop while independently providing a pressurized flow to energize an auxiliary implement.

BACKGROUND ART

Many present hydrostatic transmissions include a variable displacement hydraulic pump driven by an input shaft. A hydraulic fluid is pumped from the hydraulic pump to a hydraulic motor for driving an output shaft. In these devices, there is no mechanical linkage between the input shaft which drives the hydraulic pump and the output shaft which is driven by the hydraulic motor. The hydraulic pumps and motors used in hydrostatic transmissions are typically axial piston devices which use a small amount of fluid for internal lubrication, which in turn results in fluid being lost from the hydrostatic circuit. In order to replenish fluid lost from the hydrostatic loop during operation of the transmission, a fixed displacement charge pump is driven by the variable displacement pump to communicate a supply of fluid in a charge flow path from a fluid reservoir to the hydrostatic circuit.

A desirable feature in the transmission of a working vehicle is the capability of transmitting fluid power for driving auxiliary implements, such as lift cylinders, steering valves, and the like. In some instances, this is accomplished by means of a dedicated hydraulic pump external to the hydrostatic transmission for supplying a pressurized auxiliary flow to an auxiliary implement fluid circuit. This approach is costly and mechanically redundant. More commonly, the fixed displacement charge pump which replenishes fluid in the hydrostatic circuit is used also to supply the auxiliary flow. This type of arrangement eliminates the expense, manufacturing, and maintenance detriments associated with the provision of an additional pump.

While the above approach minimizes the mechanical complexity of the system, additional problems exist which detrimentally impact the overall efficiency of the transmission. Today, there exists two commonly employed arrangements for a hydrostatic transmission in which a single pump is utilized to provide system charge pressure as well as providing auxiliary implement flow. Each of these arrangements have significant drawbacks which affect hydrostatic transmission performance and hydrostatic transmission life.

In one arrangement, the charge flow path supplies oil for auxiliary functions, i.e., to the auxiliary implement circuit, before it is available to the hydrostatic closed loop. At high auxiliary pressure requirements the charge pump leaks substantially, and when the leakage is great enough that the charge pump cannot maintain enough flow to replace the leakage in the hydrostatic closed loop, the hydrostatic transmission component life is severely affected and may cause premature failure.

To circumvent this problem, and as proposed in the second currently used arrangement, the charge flow path supplies fluid first to the hydrostatic closed loop and then the auxiliary circuit. This creates, however, two additional problems. At high auxiliary function pressure requirements the charge pressure on the side of the hydrostatic loop which communicates with the auxiliary circuit, traditionally the "low" side of the loop, is a sum of the auxiliary pressure and the pressure setting of a charge relief valve. The addition of auxiliary pressure to the low side of the hydrostatic loop increases loading on shaft bearings and rotated components, thereby decreasing transmission life.

An additional problem lies in the fact that added auxiliary pressure on the low side of the hydrostatic loop tends to act as a brake. The braking action relates to an increased torque necessary to generate working pressure in the pump and the motor, and, in turn, lowers the torque efficiency of the pump and motor thereby increasing horsepower loss and heat generation.

The present invention is directed toward overcoming one or more of the problems set forth above.

SUMMARY OF THE INVENTION

An of object of the present invention is to provide a charge pressure priority valve adapted to provide a sufficient flow of hydraulic fluid to the charge pressure side of a hydrostatic closed loop to maintain a near constant pressure independent of auxiliary function requirements.

In the exemplary embodiment of the invention, a charge pressure priority valve includes a valve body having an interior bore with a pump inlet passage for receiving a flow from the hydraulic pump to the interior bore. A main flow outlet passage extends from the interior bore for supplying fluid to the hydrostatic fluid circuit, and an auxiliary flow outlet passage extends from the interior bore for supplying a flow of sufficient pressure to energize an auxiliary implement.

A valve spool having a pair of end-mounted pistons is disposed within the interior bore and defines a central chamber intermediate first and second end chambers in the bore. A feedback passage communicates hydrostatic charge feedback pressure to one of the end chambers, such that one of the pistons communicates with the hydrostatic feedback pressure. When the feedback pressure reaches a predetermined level, the valve spool is displaced to limit flow to the hydrostatic loop and thereby maintain a nearly constant hydrostatic charge pressure.

A biasing spring is provided in the end chamber opposite the end chamber which receives the feedback flow. The spring cooperates with the valve spool to limit flow to the auxiliary implement when the hydrostatic circuit pressure falls below a predetermined pressure.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the following description taken in conjunction with the accompanying drawings, in which like reference numerals identify like elements in the figures and in which:

DETAILED DESCRIPTION OF THE INVENTION

Figure 1:
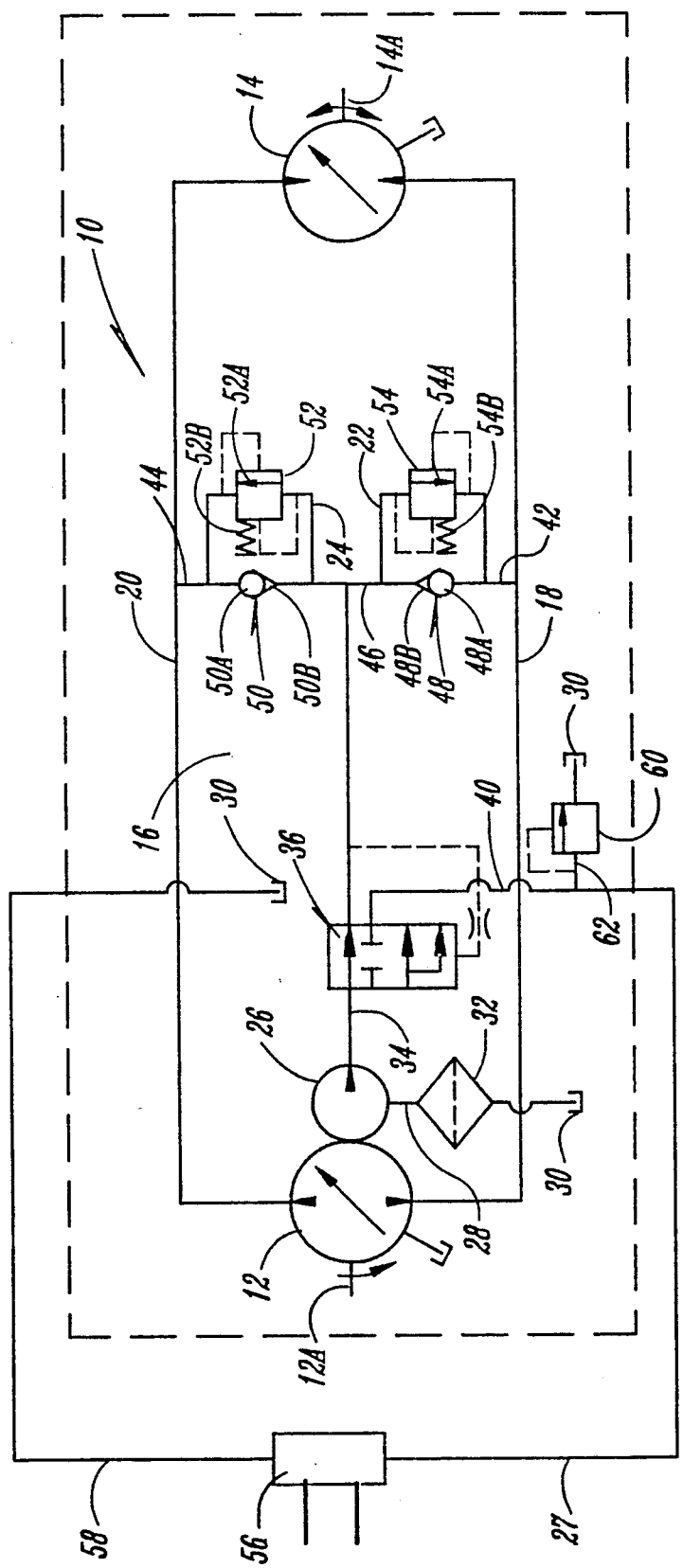
FIG. 1 is a hydrostatic circuit diagram of a hydrostatic transmission comprising a charge pressure priority valve according to the present invention.

A typical hydrostatic transmission is shown schematically in FIG. 1 and generally at 10 wherein a pair of hydraulic displacement units 12 and 14 are connected in a closed hydrostatic loop 16 by a pair of pressure lines 18 and 20 which can be hoses or passages in a housing for the displacement devices. Hydraulic device 12 is a variable displacement axial piston unit which normally functions as a pump to deliver fluid under pressure to displacement device 14 which also is a variable displacement axial piston unit and normally functions as a motor. Pump 12 is driven at a pump input shaft 12a as by a prime mover, such as an internal combustion engine (not shown), and is operable by means of substantially incompressible flow through hydrostatic loop 16 to transmit power to motor output shaft 14a. A pair of multi-function valve 22 and 24 are associated with pressure lines 18 and 20, respectively, and are further described herein.

A charge pump 26 is driven by axial piston pump 12 and supplies makeup fluid to the hydrostatic loop 16 and to an auxiliary fluid circuit 27. The charge pump 30 has an inlet connected through a line 28 to a tank reservoir 30, with a filter 32 in the line, and an outlet connected by a line 34 to a charge pressure priority valve, shown generally at 36. Charge pressure priority valve 36 apportions a pressurized flow from charge pump 26 among a pressure line 38 for maintaining a desired system pressure in hydrostatic loop 16 and a pressure line 40 for supplying flow in auxiliary circuit 27.

Multi-function valves 22 and 24 comprise known structures providing both over-pressure relief functions and pressure check functions for providing a supply of makeup fluid to the hydrostatic loop. Multi-function valve 22 is connected to pressure line 18 by a line 42 and multi-function valve 24 is connected to pressure line 20 by a line 44. The multi-function valves are cross-connected by a line 46 which also communicates with pressure line 38. With this construction, pressurized fluid is pumped by charge pump 26 over charge pressure priority valve 36 and can be directed through the multi-function valves to supply hydraulic fluid to either of pressure lines 18 and 20 in the hydrostatic loop.

Multi-function valves 22 and 24 comprise identical structures and each includes a charge pressure check valve 48 and 50, respectively, and a system pressure relief valve, 52 and 54, respectively. Check valves 48 and 50 are of a ball-type in which fluid pressure normally acts against a ball 48a and 50a, respectively, within a seat 48b and 50b, respectively, to keep fluid under charge pressure in line 46 isolate from the hydrostatic loop. When the pressure acting on the seat side of the check valve, i.e., the charge pressure exceeds the pressure on the ball side of the check valve (i.e, the hydrostatic loop pressure), the ball is unseated and the valve is opened until the pressure on opposite side of the check valve is equalized.

System pressure relief valves 52 and 54 are of a spring biased shuttle-type in which fluid pressure normally acts against a movable valve spool, represented schematically at 52a and 54a, respectively. When the fluid pressure is insufficient to overcome a biasing spring 52b and 54b, respectively, the valve is in a closed position and fluid is prevented from passing over the valve. When the fluid pressure exceeds the spring force, the valve spool shuttles to an open position and flow passes therethrough.

In normal operation of the transmission, one of pressure lines 18 and 20 operates as a high pressure, "high side" supply line for supplying pressurized fluid from pump 12 to motor 14, and the other of the pressure lines 18 and 20 functions as a low pressure, "low side" return line for delivering fluid from pump 14 to charge pump 26. Depending on the nature of the work being performed by motor shaft 14a, pressure in the high side increases as the torque requirements of the motor increase. In the event that the pressure in the high side line exceeds a predetermined value, the multi-function valves are operable to relieve the over-pressure condition and divert flow to the low side line.

Particularly, in an exemplary condition in which pressure line 18 is a high pressure line, excessive line pressure acts against spring biased spool 54a to overcome the charge pressure in line 46 and the biasing force of spring 54b to shuttle the spool across the valve and divert over-pressure flow to multi-function valve 24. The pressure of the relief flow exceeds the low side pressure acting against check valve 50 and, as a result, the check valve opens and communicates over-pressure flow with return line 20. An analogous situation arises when pressure line 20 is a high pressure line. Excessive line pressure acts against movable spool 52a to overcome the pressure level in line 46 and the biasing force of spring 52b to shift the spool and divert over-pressure flow to multi-function valve 22. The flow is of sufficient force to open check valve 48 and communicates with return pressure line 18.

The above description of the operation of the over-pressure relief function of multi-function valves 22 and 24 illustrates one function of check valves 48 and 50. Namely, when a high side relief valve opens to divert fluid to the low side of the loop, pressure in line 46 equals the sum of the charge pressure and the relief pressure. The low side check valve is forced open and the pressure of the low side of the loop is increased. In this way, the difference in pressure between the high side of the hydrostatic loop and the low side of the hydrostatic loop is maintained at a constant value when the high side of the loop is at an over-pressure, or maximum pressure, condition.

The check valves also serve a fluid make-up function in the hydrostatic loop. In the event that the system pressure in the low side line falls below the fluid pressure in line 46, one of the check valves 48 or 50 is unseated to permit make-up fluid to be supplied to the loop and increase the low side pressure. When low side system pressure falls below the charge pressure in line 46, as by loss of fluid in the hydrostatic loop due to leakage or lubrication requirements of the pump 12 or motor 14, the check valves permit fluid to replenish the supply in the hydrostatic loop. It can be understood, therefore, that the low side system pressure normally is equivalent to the system charge pressure.

Auxiliary circuit 27 includes an open-center auxiliary implement valve 56 for energizing auxiliary implements (not shown) and communicating with charge pressure priority valve 36 by means of line 40. Fluid is returned from the implement valve to tank reservoir 30 through a pressure return line 58. An implement pressure relief valve 60, of a spring biased spool-type, communicates with pressure line 40 by means of a line 62. When fluid pressure in line 40, and hence line 62, exceeds a predefined value, pressure relief valve 60 is activated to divert over-pressure fluid to tank reservoir 30.

The foregoing description describes the basic components of a hydrostatic transmission utilizing a common charge pump for supplying make-up fluid to a hydrostatic circuit and for performing auxiliary functions. The construction of charge pressure priority valve 36, whereby the flow displaced by charge pump 26 can be regulated to maintain a desired charge pressure within the hydrostatic loop independently of an auxiliary flow, now will be described.

Figure 2:
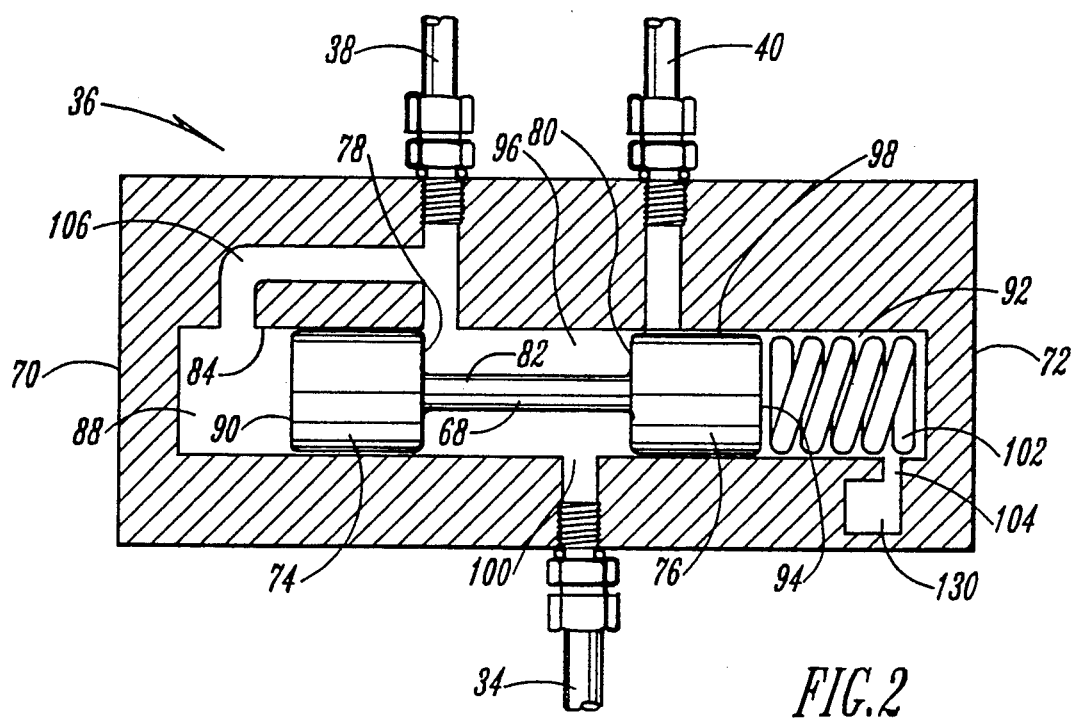
FIG. 2 is a longitudinal sectional view of a first configuration of the charge pressure priority valve shown in FIG. 1.
Figure 3:
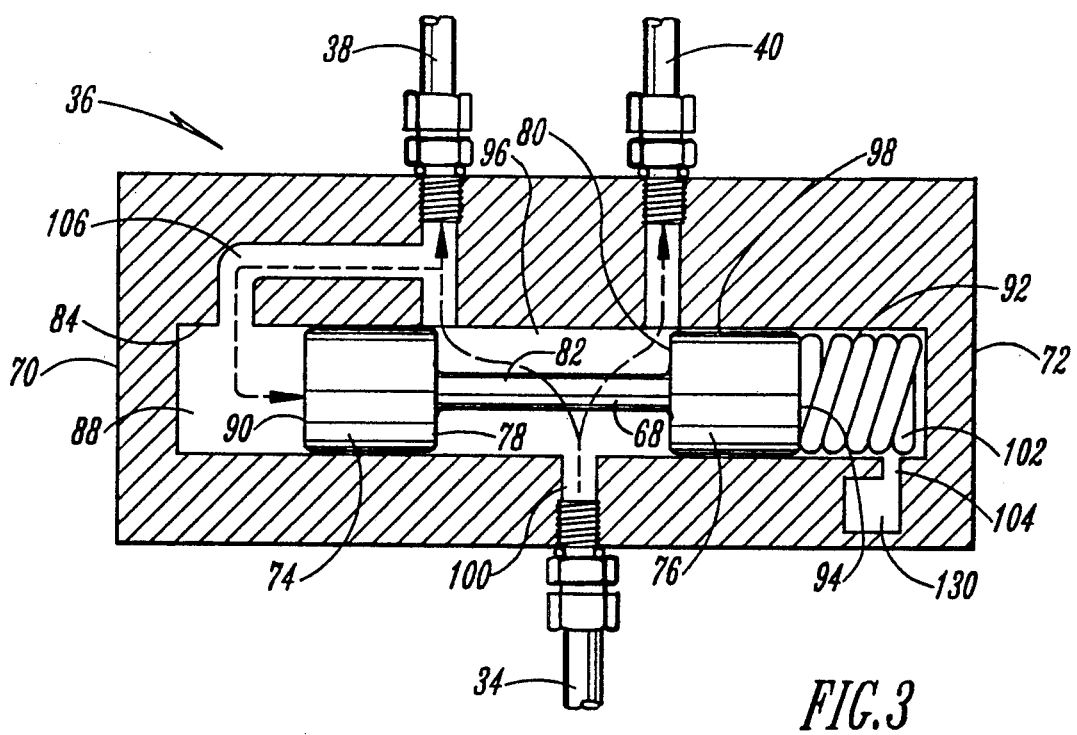
FIG. 3 is a longitudinal sectional view of a second configuration of the charge pressure priority valve shown in FIG. 1.

Referring to FIGS. 2 and 3, charge pressure priority valve 26 includes a valve body 64 having a cylindrical interior bore 66 which movably mounts a valve spool 68 between spaced apart end walls 70 and 72. The valve spool has a pair of cylindrical pistons 74 and 76 on axially-opposed spool ends 78 and 80, respectively, of a spool shaft 82, which are disposed in sealed engagement with an annular sidewall 84 of the bore to partition the interior bore into three internal chambers An annular central chamber 86 is formed in the space between the pistons and adjacent spool shaft 82. An end chamber 88 is formed between an outer face 90 of piston 74 and bore end wall 70, and an end chamber 92 is formed between an outer face 94 of piston 76 and bore end wall 72. It can be understood that the volumes of the annular central chamber 86 and the opposite end chamber 88 and 92 are variable and are established by the axial position of valve spool 68 within the interior bore.

A number of ports are formed along the length of bore sidewall 84. Main flow outlet passage 96 connects the interior bore with pressure line 38. Auxiliary flow outlet passage 98 is axially spaced from main flow outlet passage 96 and connects the interior bore with pressure line 40. A pump inlet passage 100 communicates with central chamber 86 and receives a flow from line 34. When valve spool 68 is positioned such that the pistons do not completely obstruct main flow outlet passage 96 or auxiliary flow outlet passage 98, as illustrated in FIG. 3, charge pump 26 (not shown in FIG. 3) is operable to direct a pressurized flow toward hydrostatic loop 16 and auxiliary implement valve 56. When the valve spool is disposed such that piston 76 blocks auxiliary flow outlet passage 98, as shown in FIG. 2, flow is directed only toward the hydraulic loop through pressure line 38.

A helical spring 102 is disposed in end chamber 92 and cooperates with piston face 94 to bias movement of the valve spool toward and away from end wall 72. A drain passage 104 interconnects the end chamber with tank reservoir 30 and purges excess fluid from the interior bore. Due to the sealed engagement of piston 76 with the interior bore sidewall 84, end chamber 92 continually is isolated from central chamber 86 and opposite end chamber 88.

A main flow feedback passage 106 interconnects pressure line 38 and end chamber 88 such that a charge pressure equivalent to that supplied to the hydrostatic loop by means of line 38 is directed against face 90 of piston 74. As will be described below, pressure acting against piston face 90 normally urges valve spool 68 to the right as shown in FIGS. 2 and 3 and is opposed by the biasing force developed by helical spring 102 in the opposite end chamber 92.

It is believed the operation of the charge pressure priority valve will be readily understood from the foregoing description and may be summarized as follows. Initially, charge pressure within lines 34 and 38 is low and the charge pressure priority valve assumes a position as illustrated in FIG. 2, with the valve spool positioned such that flow is prevented from traveling toward auxiliary circuit 27 and there is no pressure drop across main flow outlet passage 96. As charge pump 26 continuously pumps fluid toward the hydrostatic loop, charge pressure begins to rise. Charge pressure also rises within end chamber 88, but because opposite end chamber 92 is isolated from the central chamber and end chamber 88, no fluid enters end chamber 92 and the charge pressure force acting against piston face 90 is reacted only by spring 102 As long as the force developed by charge pressure within pressure line 38, and therefore within end chamber 88, does not exceed the preload stiffness of spring 92, the valve spool remains in this configuration, with pressurized fluid being directed solely toward hydrostatic loop 16.

When the charge pressure reaches a level at which the resultant force acting against piston face 90 overcomes the preload of spring 92, valve spool 68 shuttles to the right as shown in FIG. 3. Piston 72 shifts across auxiliary flow outlet passage 98 to permit an auxiliary flow to the auxiliary circuit, and piston 74 shifts across main flow outlet passage 96 to create a pressure drop between central chamber 86 and pressure line 38. By appropriately selecting the stiffness of spring 102, the charge pressure, and thereby the low side system pressure, at which flow becomes available for auxiliary functions can be predetermined.

When auxiliary pressure requirements are increased, as by work being performed by an auxiliary implement, the fluid pressure in passage 34 and central chamber 86 also increases. While it is desirable to provide a high pressure flow to the auxiliary implement circuit, it is important that the hydrostatic loop is not subjected to an equivalent and potentially damaging high pressure. To this end, the charge pressure priority valve maintains a constant relatively low pressure within the hydrostatic loop during increased pressurization of the auxiliary circuit. As auxiliary pressure rises, flow entering end chamber 88 through main flow feedback passage 106 continuously shuttles valve spool 68 further to the right. Displacement of piston 74 increasingly shunts flow to line 38 and thereby increases the pressure drop across outlet passage 96. The increased pressure drop provides that a constant pressure is maintained in line 38 and, therefore, the low side of the hydrostatic loop. The hydrostatic loop pressure is thereby regulated independently of increased auxiliary pressure in the central chamber.

Due to the above mentioned leakage and lubrication requirements of hydraulic pump 12 and motor 14, a volume of fluid is consumed during operation of the transmission, which in turn results in an increase in the charge flow requirements of the hydrostatic loop. The pressure priority valve is responsive to the changed loop charge flow requirements. When the hydrostatic loop is operating at a reduced pressure, the low side check valve opens to permit make-up fluid to enter the loop. As a result, charge pressure in line 38, and therefore end chamber 88, is reduced and the force acting against piston face 90 is overcome by the elastic restoring force of spring 102. Valve spool 68 shifts to the left as shown in FIGS. 2 and 3 under the force of the spring to move piston 74 across main flow outlet passage 96 to reduce the pressure drop until sufficient charge pressure is developed within line 38 to satisfy the requirements of the hydrostatic loop. Once the hydrostatic loop is recharged, charge pressure again rises until the valve spool shifts to increase flow through passage 98 for performing auxiliary functions in a manner as described above.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A charge pressure priority valve operatively associated with a closed circuit hydraulic system having a hydraulic pump for supplying a flow of sufficient pressure to energize an auxiliary implement and regulating, independent of flow, a pressure delivered to a hydrostatic fluid circuit including said pump and a motor with more than one line of fluid communication for bi-directional flow between said pump and motor, comprising:
   a valve body having an interior bore with a pump inlet passage for communicating a flow from the hydraulic pump to the interior bore;
   a main flow outlet passage extending from the interior bore for supplying fluid to the hydrostatic fluid circuit and having a main flow feedback passage interconnecting the main flow outlet passage and the interior bore;
   an auxiliary flow outlet passage extending from the interior bore for supplying a flow of sufficient pressure to energize an auxiliary implement;
   a valve spool disposed within the interior bore and defining a central chamber intermediate a pair of spaced apart end chambers, one of the pair of end chambers being isolated from the other of the pair of end chambers; and
   a fluid passage means connecting one of said end chambers directly to a source of constant pressure.

2. The charge pressure priority valve of claim 1 in which the main flow feedback passage interconnects the main flow outlet passage with only one of the end chambers in the interior bore for supplying a flow of sufficient pressure to move the valve spool and thereby limit the flow from the pump inlet passage to the main flow outlet passage.

3. The charge pressure priority valve of claim 1 including biasing means in one of the end chambers in the interior bore for supplying a force sufficient to move the valve spool and thereby limit the flow from the pump inlet passage to the auxiliary flow outlet passage.

4. The charge pressure priority valve of claim 1 including a first piston mounted at one end of the valve spool to limit flow from the pump inlet passage to the main flow outlet passage, and a second piston mounted at an opposite end of the valve spool to limit flow from the pump inlet passage to the auxiliary flow outlet passage.

5. A charge pressure priority valve associated with a hydraulic pump for distributing a pressurized flow among a closed hydrostatic circuit, including said pump and a motor with more than one line of fluid communication for bi-directional flow between said pump and motor, and an auxiliary implement in a manner such that the provision of pressurized flow to the auxiliary implement limits flow to the hydrostatic circuit, comprising:
   a valve body having an interior bore with a pump inlet pressure for communicating a flow from the hydraulic pump to the interior bore;
   a main flow outlet passage extending from the interior bore for supplying fluid at a nearly constant pressure, independent of flow, to the hydrostatic circuit;
   an auxiliary flow outlet passage extending from the interior bore for supplying a flow of sufficient pressure to energize an auxiliary implement;
   a valve spool disposed within the interior bore and having a pair of end-mounted pistons defining a central chamber intermediate a first end chamber and a second end chamber;
   a main flow feedback passage communicating a feedback flow to only the first end chamber, wherein one of the pistons communicates with the feedback flow such that when the feedback flow reaches a predetermined pressure the valve spool is displaced to limit flow to the hydrostatic circuit; and
   a fluid passage means connecting said second end chamber directly to a source of constant pressure.

6. The charge pressure priority valve of claim 5 in which the pump inlet passage communicates with the intermediate central passage of the interior bore, such that displacement of the valve spool results in the pump inlet passage communicating with the auxiliary flow outlet passage to supply a pressurized flow for energizing an auxiliary implement.

7. The charge pressure priority valve of claim 5 including spring biasing means in the second end chamber for cooperating with the valve spool to limit flow to the auxiliary implement when the feedback flow falls below a predetermined pressure.

8. The charge pressure priority valve of claim 6 in which each of the pair of end-mounted pistons is in sealing engagement with the valve body such that the pump inlet passage is isolated from the second end chamber.

9. A charge pressure priority valve for distributing a pressurized flow among a closed hydrostatic circuit, including said pump and a motor with more than one line of fluid communication of bi-directional flow between said pump and motor, and an auxiliary implement in a manner such that the provision of pressurized flow to the auxiliary implement limits the flow to the hydrostatic circuit, and further such that a decrease in a hydrostatic circuit pressure limits the flow to the auxiliary implement, the charge pressure priority valve comprising:
   a valve body having an interior bore with a pump inlet passage for communicating a flow from a hydraulic pump to the interior bore;
   a main flow outlet passage extending from the interior bore for supplying fluid at a nearly constant pressure, independent of flow, to the hydrostatic circuit;
   an auxiliary flow outlet passage extending from the interior bore for supplying a flow of sufficient pressure to energize an auxiliary implement;
   a valve spool disposed within the interior bore and having a pair of end-mounted pistons defining a central chamber intermediate a first end chamber and a second end chamber;
   a main flow feedback passage communicating a feedback flow to only the first end chamber, wherein one of the pistons cooperate with the feedback flow such that when the feedback flow reaches a predetermined pressure the valve spool is displaced to limit flow to the hydrostatic circuit;

spring biasing means in the second end chamber for cooperating with the valve spool to limit flow to the auxiliary implement when the feedback flow falls below a predetermined pressure, and a fluid passage means connecting said second end chamber directly to a constant pressure source.

10. The charge pressure priority valve of claim 9 in which the pump inlet passage communicates with the intermediate central passage of the interior bore, such that displacement of the valve spool results in the pump inlet passage communicating with the auxiliary flow outlet passage to supply a pressurized flow for energizing an auxiliary implement.

11. The charge pressure priority valve of claim 9 in which each of the pair of end-mounted pistons is in sealing engagement with the valve body such that the pump inlet passage is isolated from the second end chamber.

12. In a hydrostatic transmission having a closed circuit hydraulic system having a hydraulic pump and a hydraulic motor connected with more than one line of fluid communication for bi-directional flow between said pump and motor in a fluid circuit with a charge pump driven by the hydraulic pump and operatively associated with an auxiliary implement circuit, a charge pressure priority valve interposed between the charge pump and the fluid circuit and the auxiliary implement circuit, comprising:

a valve body having an interior bore with a pump inlet passage for communicating a flow from the charge pump to the interior bore;

a main flow outlet passage extending from the interior bore for supplying fluid at a nearly constant pressure, independent of flow, to the hydrostatic circuit;

an auxiliary flow outlet passage extending from the interior bore for supplying a flow of sufficient pressure to energize an auxiliary implement circuit;

a valve spool movably disposed within the interior bore and defining a central chamber intermediate a first end chamber and a second end chamber within the interior bore, the first end chamber being isolated from the second end chamber;

valve spool displacement means for displacing the valve spool to
  (a) limit flow to the hydrostatic circuit when pressure in the main flow outlet passage exceeds a predetermined level, and
  (b) limit flow to the auxiliary implement when pressure in the main flow outlet passage falls below a predetermined level; and a fluid passage means connecting said second end chamber directly to a constant pressure source.

13. The charge pressure priority valve of claim 12 in which the valve spool displacement means for displacing the valve spool to limit flow to the hydrostatic circuit when pressure in the main flow outlet passage exceeds a predetermined level comprises a main flow feedback passage communicating a feedback flow to only the first end chamber.

14. The charge pressure priority valve of claim 12 in which the valve spool displacement means for displacing the valve spool to limit flow to the auxiliary implement when pressure in the main flow outlet passage falls below a predetermined level comprises spring biasing means in the second end chamber.

* * * * *

UNITED STATES PATENT AND TRADEMARK OFFICE
CERTIFICATE OF CORRECTION

PATENT NO.   : 5,165,233
DATED        : November 24, 1992
INVENTOR(S)  : Michael A. Betz It is certified that error appears in the above-identified patent and that said Letters Patent is hereby corrected as shown below:

Title page,
Item "[73]" should be shown as follows:-- [73] Assignee: Sauer Inc., Ames, Iowa --.

Signed and Sealed this

Twenty-eighth Day of August, 2001

*Attest:*

NICHOLAS P. GODICI
*Attesting Officer*  *Acting Director of the United States Patent and Trademark Office*